United States Patent
Li

(10) Patent No.: US 9,660,925 B2
(45) Date of Patent: May 23, 2017

(54) METHOD AND APPARATUS FOR IMPLEMENTING SCHEDULING IN PING PROCESS

(71) Applicant: ZTE Corporation, Shenzhen, Guangdong (CN)

(72) Inventor: Meijuan Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 75 days.

(21) Appl. No.: 14/759,743

(22) PCT Filed: Oct. 24, 2013

(86) PCT No.: PCT/CN2013/085917
§ 371 (c)(1),
(2) Date: Jul. 8, 2015

(87) PCT Pub. No.: WO2014/110926
PCT Pub. Date: Jul. 24, 2014

(65) Prior Publication Data
US 2015/0358247 A1 Dec. 10, 2015

(30) Foreign Application Priority Data
Jan. 18, 2013 (CN) .......................... 2013 1 0020135

(51) Int. Cl.
*H04L 12/28* (2006.01)
*H04L 12/56* (2006.01)
(Continued)

(52) U.S. Cl.
CPC .......... *H04L 47/62* (2013.01); *H04L 12/6418* (2013.01); *H04L 43/103* (2013.01);
(Continued)

(58) Field of Classification Search
CPC .............................. H04L 47/62; H04L 49/90
See application file for complete search history.

(56) References Cited

U.S. PATENT DOCUMENTS

2003/0227912 A1 12/2003 Kachi
2010/0316159 A1 12/2010 Bo
(Continued)

FOREIGN PATENT DOCUMENTS

CN 101742564 A 6/2010
CN 102014508 A 4/2011
(Continued)

OTHER PUBLICATIONS

International Search Report in international application No. PCT/CN2013/085917.
(Continued)

*Primary Examiner* — Derrick Ferris
*Assistant Examiner* — Farhad Ali
(74) *Attorney, Agent, or Firm* — Neifeld IP Law, PC

(57) ABSTRACT

Provided are a method and apparatus for implementing scheduling in a Ping process. An MAC layer of an eNB learns about the traffic of UE, determines whether the UE is carrying out Ping according to a learning result, determines a period of sending a data packet by the UE when determining that the UE is carrying out Ping and carries out pre-scheduling according to the period. According to the technology of implementing scheduling in the Ping process in the present disclosure, a high layer can report the traffic statistic to the MAC layer; and the MAC layer learns continuously based on a set learning period so as to judge whether the UE is carrying out Ping, and determines the period of sending a data packet by the UE when determining that the UE is carrying out Ping to predict the coming of a next data packet for the Ping and carry out pre-scheduling, thereby saving the time of sending an SR by the UE; in this way, the time delay for the Ping is considered, moreover, the technology can be used in the network all the time and do not affect the traffic of a system.

10 Claims, 2 Drawing Sheets

(51) Int. Cl.
*H04L 12/863* (2013.01)
*H04L 12/861* (2013.01)
*H04L 12/64* (2006.01)
*H04L 12/26* (2006.01)
*H04W 72/12* (2009.01)

(52) U.S. Cl.
CPC ......... *H04L 49/90* (2013.01); *H04W 72/1221* (2013.01); *H04L 2012/6489* (2013.01)

(56) References Cited

U.S. PATENT DOCUMENTS

| | | |
|---|---|---|
| 2011/0170464 A1 | 7/2011 | Sengottaiyan |
| 2012/0155416 A1 | 6/2012 | Zhang |
| 2012/0315906 A1 | 12/2012 | Stephens |
| 2014/0153483 A1 | 6/2014 | Goransson et al. |
| 2014/0295865 A1* | 10/2014 | Fantaye ............ H04W 72/1226 455/450 |
| 2015/0195826 A1 | 7/2015 | Goransson et al. |

FOREIGN PATENT DOCUMENTS

| | | | |
|---|---|---|---|
| CN | 102217405 A | 10/2011 | |
| EP | 2343930 A2 | 7/2011 | |
| EP | 2475208 A1 | 7/2012 | |
| EP | 2490477 A1 | 8/2012 | |
| GB | 2389493 A | 12/2003 | |
| SE | WO 2013085441 A1 * | 6/2013 | ........ H04W 72/1226 |
| WO | 2008097177 A2 | 8/2008 | |

OTHER PUBLICATIONS

English Translation of the Written Opinion of the International Search Authority in international application No. PCT/CN2013/085917.
Google English translation of CN102217405.
International Search Report in international application No. PCT/CN2013/085917, mailed on Jan. 23, 2014.
English Translation of the Written Opinion of the International Search Authority in international application No. PCT/CN2013/085917, mailed on Jan. 23, 2014.
Supplementary European Search Report in European application No. 13871595.8, mailed on Nov. 27, 2015.

\* cited by examiner

METHOD AND APPARATUS FOR IMPLEMENTING SCHEDULING IN PING PROCESS

CROSS REFERENCE TO RELATED APPLICATIONS

This application is a national stage entry of PCT/CN2013/085917, filed Oct. 24, 2013, which published as WO 2014/110926 in a language other than English on Jul. 27, 2014, which claims priority to Chinese Application No. 201310020135.X, filed Jan. 18, 2013; and these applications are incorporated herein by reference.

TECHNICAL FIELD

The present disclosure relates to the field of communications, in particular to a method and an apparatus for implementing scheduling in a Packet Internet Grope (Ping) process.

BACKGROUND

Ping is employed for testing network connection, and for fixing the size of and periodical sending of a data packet. which is used for the Ping. Ping mainly focuses on a time delay; the smaller the time delay is, the better the Ping is. The Ping here generally refers to uplink Ping; and for the downlink, when a service comes, an Evolved NodeB (eNB) can directly carry out scheduling according to the service data in its buffering area.

For the uplink Ping, the following two scheduling methods are usually used: in one method, a pre-scheduling solution is not adopted, and when a service comes, User Equipment (UE) is triggered to send a Scheduling Request (SR), and an eNB carries out DCI0 authorization to enable the UE to give a Buffer Status Reporting (BSR). After the UE gives the BSR, the eNB carries out DCI0 authorization according to the size of the BSR, and then carries out scheduling for the uplink Ping according to the authorization of the DCI0. The method is disadvantaged in a large time delay.

In the other method, after the service triggers the UE to send the SR, the eNB grants enough authority to the UE so that the service of the UE is scheduled directly, wherein the authority is granted to the UE by the eNB through the DCI0. In the method, although the time delay can be reduced for the Ping, it is necessary to determine that the UE is carrying out Ping at first in order to utilize the uplink resources effectively; otherwise, if the eNB grants a relatively large authority as soon as receiving the SR, the UE may send much padding and the effective capacity of the system may be reduced because the UE may be not carrying out Ping.

SUMMARY

In view of this, the main objective of an embodiment of the present disclosure is to provide a method and an apparatus for implementing scheduling in a Ping process, so as to reduce time delay for the Ping.

To this end, the technical solution of the embodiment of the present disclosure is implemented as follows:

A method for implementing scheduling in a Ping process, includes:

a Media Access Control (MAC) layer of an eNB learns about traffic of UE, determines whether the UE is carrying out Ping according to a learning result, determines a period of sending a data packet by the UE when determining that the UE is carrying out Ping and carries out pre-scheduling according to the period, wherein a time length of the learning is w*Δ, and is taken as a learning period, where Δ is learning times in the learning period, and w is a duration of each learning.

The statuses learned in the learning period may be set as a status array.

Whether to carry out pre-scheduling in a later learning period is determined according to a learning result of a previous learning period.

The step that whether the UE is carrying out Ping is determined may include:

whether adjacent values or values with a fixed interval in the status array are equal is determined by comparison, and if the adjacent values or the values with a fixed interval are equal and indicate that the UE is carrying out Ping, it is determined that the UE is carrying out Ping.

Determining the period may include:

time points of values stored in a learning period are subjected to subtraction two by two to obtain difference values, wherein a difference value obtained most frequently in the obtained difference values is taken as the period of sending a data packet by the UE.

The method may further include: a high layer periodically sends a traffic statistic for carrying out the learning to the MAC layer.

An apparatus for implementing scheduling in a Ping process includes a learning module, a judgment module and a pre-scheduling module, wherein the learning module is configured to learn about traffic of UE and inform the judgment module of a learning result;

the judgment module is configured to determine whether the UE is carrying out Ping according to the learning result, determine a period of sending a data packet by the UE when determining that the UE is carrying out Ping, and further inform the pre-scheduling module of the period; and the pre-scheduling module is configured to carry out pre-scheduling according to the period, wherein a time length of the learning is w*Δ and is taken as a learning period, where Δ is learning times in the learning period, and w is a duration of each learning.

The learning module may be configured to set statuses learned in the learning period as a status array; and the pre-scheduling module may be configured to determine whether to carry out pre-scheduling in a later learning period according to a learning result of a previous learning period.

When determining whether the UE is carrying out Ping, the judgment module may be configured to:

determine by comparison whether adjacent values or values with a fixed interval in the status array are equal, and if the adjacent values or the values with a fixed interval are equal and indicate that the UE is carrying out Ping, determine that the UE is carrying out Ping.

When determining the period, the judgment module may be configured to:

subtract time points of values stored in a learning period two by two to obtain difference values, wherein a difference value obtained most frequently in the obtained difference values is taken as the period of sending a data packet by the UE.

The learning module may be further configured to receive a traffic statistic for carrying out the learning which is sent from a high layer to an MAC layer periodically.

According to the technology of implementing scheduling in a Ping process in the embodiments of the present disclosure, a high layer can report a traffic statistic to an MAC layer; and the MAC layer learns continuously based on a set learning period to judge whether the UE is carrying out Ping, and determines a period of sending a data packet by UE when determining that the UE is carrying out Ping, so as to predict the coming of a next data packet for the Ping and carry out pre-scheduling; therefore, the time of sending an SR is saved for the UE, and the time delay for the UE to carry out is reduced. Moreover, the technology can be used in the network all the time and do not affect the traffic of the system.

DETAILED DESCRIPTION

Figure 1:
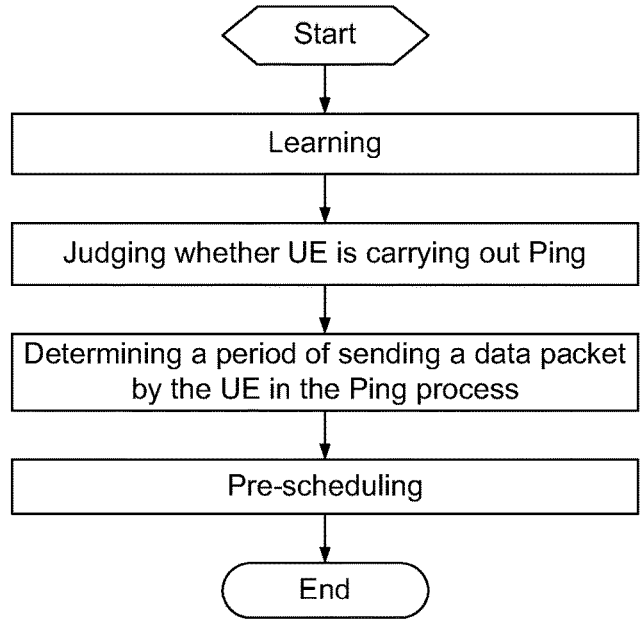
FIG. 1 is a schematic diagram showing a flow of implementing scheduling in a Ping process in an embodiment of the present disclosure.

In an actual application, operation can be carried out as shown in FIG. 1. A learning module learns about traffic and informs a judgment module of a learning result; the judgment module determines whether UE is carrying out Ping according to the received learning result, determines a period of sending a data packet by UE when determining that the UE is carrying out Ping and informs a pre-scheduling module of the period; and the pre-scheduling module carries out pre-scheduling according to the received period.

During the pre-scheduling, an eNB may grant uplink authority DCI0 actively, and the UE sends a service according to the authority. If the UE has a data packet to be sent for the uplink Ping, the UE sends a corresponding data packet according to the DCI0 (i.e., uplink authority) given by the eNB, and the granted DCI0 is aimed to enable the UE to send its data packet for the Ping.

The learning module, the judgment module and the pre-scheduling module may be arranged in an MAC layer. In addition, the judgment module may include a Ping judgment module and a periodic judgment module, wherein the Ping judgment module may determine whether the UE is carrying out Ping according to the received learning result, and informs the periodic judgment module when determining that the UE is carrying out Ping; and the periodic judgment module determines the period of sending a data packet by the UE and informs the pre-scheduling module of the period.

Specifically, a high layer may periodically (such as every millisecond) reports a traffic statistic in this period to the MAC layer, and the traffic statistic can be received by the learning module. Based on the principle in FIG. 2, a time length of the learning can be set to w*Δ in the learning module and is taken as a learning period, where Δ is learning times in one learning period, and w is the duration of each learning. Whether to carry out pre-scheduling in a later learning period can be determined according to a learning result in a previous learning period. For example, whether to carry out pre-scheduling in a second learning period is determined according to a learning result in a first learning period; whether to carry out pre-scheduling in a third learning period is determined according to a learning result in the second learning period, and so on. The statuses learned in the learning period can be set as a status array, and the learning process is continued all the time.

The statuses in a learning period can be obtained through the learning from the learning module, and the statuses can form a status array to be input to the judgment module; and the judgment module determines whether the UE is carrying out Ping (for example, it determines whether the UE is carrying out Ping according to adjacent status values or status values with a fixed interval in the status array). If a judgment result of the judgment module is that the UE is not carrying out Ping, the subsequent normal flow is executed; and if a judgment result of the judgment module is that the UE is carrying out Ping, a period of sending a data packet is determined for the UE (for example, a proper peak value is selected to determine the period by judging the status values and the traffic of each corresponding peak value).

Then, the judgment module informs the pre-scheduling module of the determined period of sending a data packet by the UE, and the pre-scheduling module carries out pre-scheduling to enable the UE not to send an SR as much as possible, thus, time delay can be reduced effectively for the Ping of the UE.

The present disclosure is further described below in combination with specific embodiments in detail.

During the learning, the learning can be started after the access of the UE, and the learning is mainly based on high layer's statistic of traffic transmitted successfully. The high layer reports the traffic statistic in the learning period to the MAC layer every millisecond, and the traffic statistic can be received by the learning module. A time length of the learning can be set to w*Δ for the learning module and is taken as a learning period, and whether to carry out pre-scheduling in a later learning period can be determined according to a learning result in a previous learning period. For example, whether to carry out pre-scheduling in a second learning period is determined according to a learning result in a first learning period; whether to carry out pre-scheduling in a third learning period is determined according to a learning result in the second learning period, and so on. The statuses learned in the learning period can be set as a status array, and the learning process is continued all the time. The values in the status array [StateValue1, StateValue2, StateValue3 . . . StateValue(Δ−1), StateValueΔ] are calculated by learning.

Whether the adjacent values or the values at a fixed interval are equal in the status array can be determined by comparison, and if they are equal and indicate that the UE is carrying out Ping, it is determined that the UE is carrying out Ping. If a judgment result is that the UE is not carrying out Ping, the subsequent normal flow is executed; and if a judgment result is that the UE is carrying out Ping, the period of sending a data packet is determined for the UE. For example, the time points of the values stored in the learning period are subtracted two by two to obtain difference values, and a difference value obtained most frequently is taken as the period of the Ping.

Figure 3:
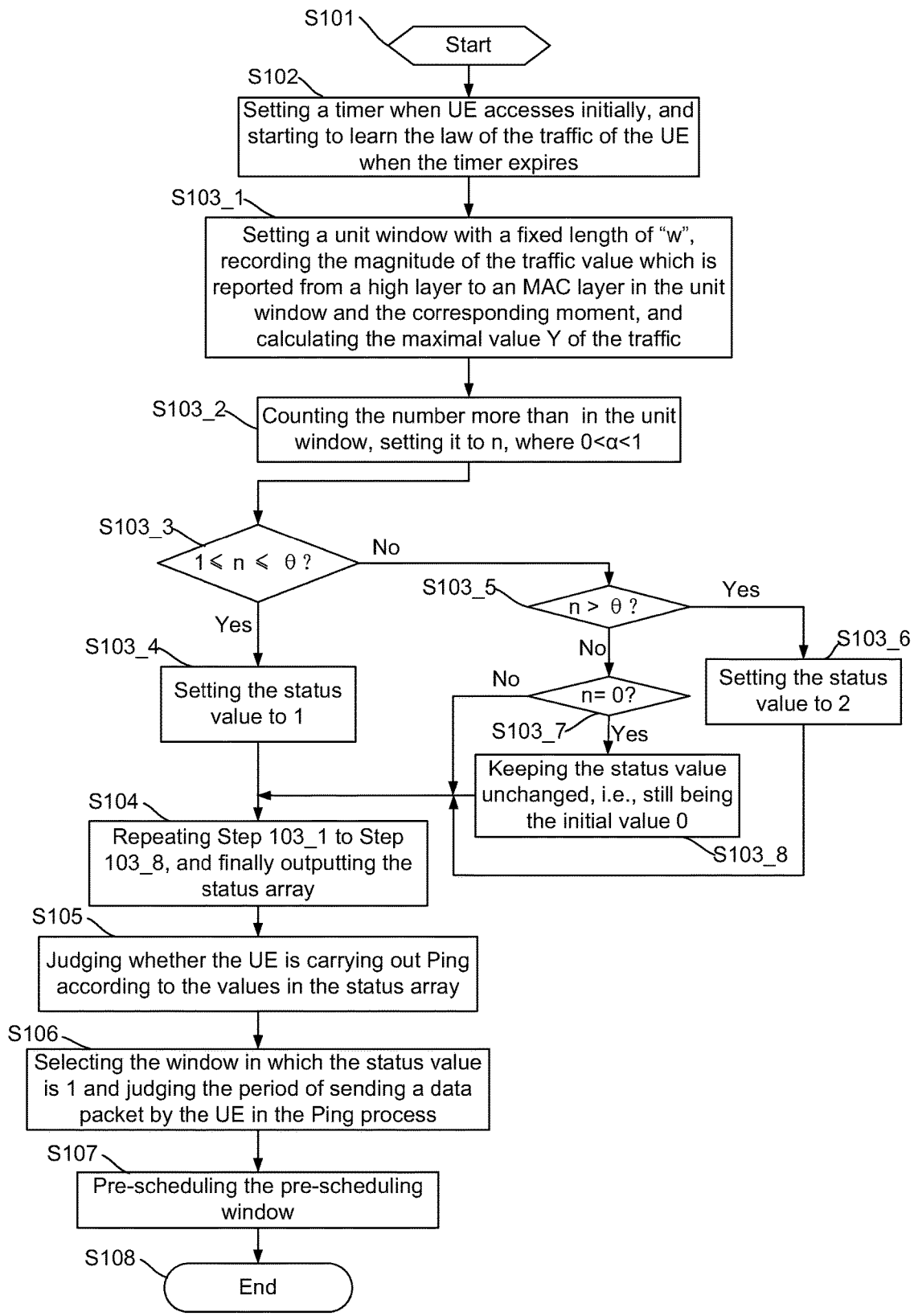
FIG. 3 is a diagram showing a flow of predicting Ping and a period of sending a data packet by UE in an embodiment of the present disclosure.

In a specific application, the flow as shown in FIG. 3 can be executed, as shown in the following two embodiments.

First Embodiment

For the Ping in an Unacknowledged Mode (UM) of LTE, whether the UE is carrying out Ping can be determined by the analysis of a high layer, pre-scheduling can be implemented through the learning of the MAC layer without the analysis process of the high layer; firstly, the length of a unit window can be set as follows: w=500 ms, Δ=4 and α=0.2. Then, the following steps are executed.

Step 101 is start.

Step 102 is during the initial access of UE, an eNB sets a timer on the MAC layer and starts to learn the law of traffic of the UE when the timer expires, and Step 103_1 is executed.

Specifically, when an UE example is set on the MAC layer, a timer is started, the timing length of the timer is set to T millisecond. When the timer expires, it is indicated that the initial random access process of the UE is completed.

The traffic statistic is started when the high layer sends a preamble from the UE; the value of the traffic statistic is reported to the MAC layer every millisecond; and since the number of bits to be transmitted in a certain window length is ensured to be definite no matter for a GBR or an NGBR service, if the UE is sending a data packet in the Ping process, the data packet is definite in size and period, accordingly, the traffic is definite.

Step 103_1 is that a unit window with a fixed length "w" is set, the magnitude of the traffic value reported from the high layer to the MAC layer in the unit window and a corresponding moment are recorded, and the maximal value of the traffic is calculated.

The specific learning process is as follows:

a time length of the learning is $w*\Delta$ and is taken as learning period, and whether to carry out pre-scheduling in a second learning period is determined according to a learning result in a first learning period; whether to carry out pre-scheduling in a third learning period is determined according to a learning result in the second learning period, and so on; the status array [StateValue1, StateValue2, StateValue3 ... StateValue($\Delta$−1), StateValue$\Delta$] learned in each learning period may be initialized to [0, 0, 0 ... 0, 0] when the next learning period starts, and the learning process is continued all the time.

Provided that the initial value of the state value x is 0, x=1, 2, 3 ... $\Delta$−1, $\Delta$, where $\Delta$ represents the times of continuous learning, and Step 103_2 to Step 103_8 are one learning process. A status array [StateValue1, StateValue2, StateValue3 ... StateValue($\Delta$−1), StateValue$\Delta$] is calculated by learning continuously for $\Delta$ times, specifically as follows:

step 103_2: a unit window of a fixed length "w" millisecond is set, the magnitudes Thr1_x, Thr2_x ... Thrm_x of traffic values reported from a user plane to the MAC layer in the unit window and the corresponding moments t1_x, t2_x ... tm_x are recorded, and γ=max(Thr1_x, Thr2_x ... Thrm_x) is calculated, where the unit of w is millisecond; the number more than αγ in (Thr1_x, Thr2_x ... Thrm_x) is counted, and the number is set to n, where 0<alpha<1;

step 103_3: whether 1≤n≤θ is true is judged, if it is true, step 103_4 is executed, otherwise, step 103_5 is executed;

step 103_4: the status value x is assigned to 1 (it is determined that the UE is carrying out Ping), and step 104 is executed;

step 103_5: whether n>θ is true is judged, if it is true, step 103_6 is executed, otherwise, step 103_7 is executed;

step 103_6: the status value x is assigned to 2; the stored (Thr1_x, Thr2_x ... Thrm_x) and t1_x, t2_x ... tm_x are cleared; and step 104 is executed;

step 103_7: whether n=0 is true is judged, if it is true, step 103_8 is executed, otherwise, Step 104 is executed;

step 103_8: the StateValuex is fixed, i.e., 0; the stored (Thr1_x, Thr2_x ... Thrm_x) and t1_x, t2_x ... tm_x are cleared; and step 104 is executed; and step 104: step 103_1 to step 103_8 are repeated, each value in the status array [StateValue1, StateValue2, StateValue3 ... StateValue($\Delta$−1), StateValue] is calculated.

Step 105 is that whether the UE is carrying out Ping is judged according to the learned content, if (StateValue$\Delta$=StateValue($\Delta$−2), and StateValue$\Delta$=1), or (StateValue($\Delta$−1)=StateValue$\Delta$−3), and StateValue$\Delta$−1)=1), or (StateValue$\Delta$)=StateValue$\Delta$−3), and StateValue$\Delta$)=1), it is indicated that the UE is carrying out Ping; otherwise, it is indicated that the UE is scheduled dynamically or is not in service, so that scheduling is carried out according to an actual condition.

Step 106 includes that a window of which the status value is 1 is selected for periodic judgment, specifically:

After learning is executed continuously for $\Delta$ times, the stored traffic values are:

[(Thr1_1, Thr2_1 ... Thrm_1), (Thr1_2, Thr2_2 ... Thrm_2) ... (Thr1_$\Delta$, Thr2_$\Delta$ ... Thrm_$\Delta$)];

the corresponding moments are:

[(t1_1, t2_1 ... tm_1), (t1_2, t2_2 ... tm_2) ... (t1_$\Delta$, t2_$\Delta$ ... tm_$\Delta$)];

Note: the values stored in the two arrays above are the corresponding values when StateValuex=1.

Every adjacent two values in the array [(t1_1, t2_1 ... tm_1), (t1_2, t2_2 ... tm_2) ... (t1_$\Delta$, t2_$\Delta$ ... tm_$\Delta$)] stored in the period of learning continuously for $\Delta$ times are subtracted to obtain difference values, i.e., [(t2_1−t1_1) ... (tm_1−t(m−1)_1), (t1_2−tm_1) ... ].

By the operation above, a status array is obtained, and the value $\xi$ occurring most frequently in the status array is counted, and $\xi$ is the period of sending a data packet by the UE in the Ping process. When $\xi$ is not unique (such as $\xi_1$, $\xi_2$, and $\xi_3$), the following processing can be executed: the mean of $\xi$ is calculated, $\xi$Average=mean($\xi_1$, $\xi_2$, $\xi_3$); the $\xi$Average is taken as the period of sending a data packet by the UE in the Ping process; and $\Omega$=max($|\xi_{Average}-\xi_1|$, $|\xi_{Average}-\xi_2|$, $\xi_{Average}-\epsilon_3$) is taken to judge a fluctuation range of a window in a next Ping moment.

Step 107 includes that a pre-scheduling window is pre-scheduled.

Figure 2:
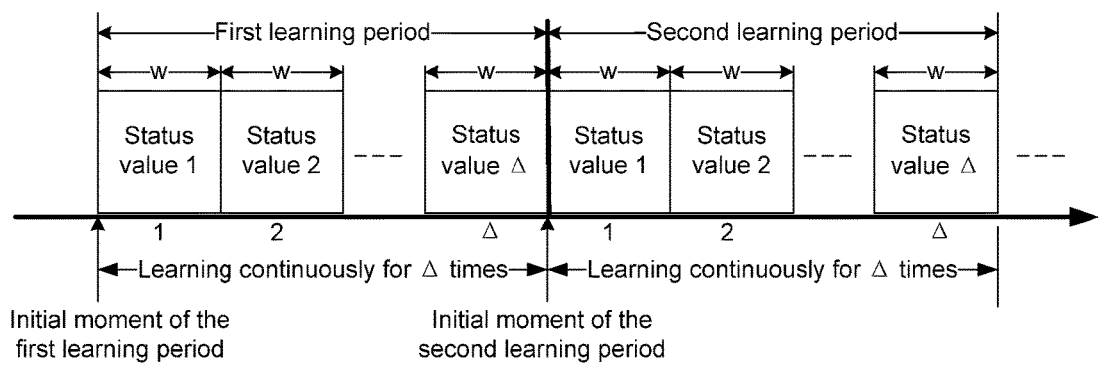
FIG. 2 is a schematic diagram showing the principle of learning in an embodiment of the present disclosure.

As shown in FIG. 2, if it is determined that the UE is carrying out Ping through the learning in a first learning period, a second learning period is pre-scheduled. Firstly, the first point η of which the traffic is not 0 and which is considered to belong to Ping in the second learning period is found out, so as to predict the coming of a next Ping moment according to the period of sending a data packet by the UE in the Ping process.

η can be determined by many methods, for example:

after continuous learning is carried out for $\Delta$ times, the stored traffic values are [(Thr1_1, Thr2_1 ... Thrm_1), (Thr1_2, Thr2_2 ... Thrm_2) ... (Thr1_$\Delta$, Thr2_$\Delta$ ... Thrm_$\Delta$)]; and the values in status array [(Thr1_($\Delta$−3), Thr2_($\Delta$−3) ... Thrm_($\Delta$−3)), (Thr1_($\Delta$−2), Thr2_($\Delta$−2) ... Thrm_($\Delta$−2)), (Thr1_($\Delta$−1), Thr2_($\Delta$−1) ... Thrm_($\Delta$−1)), (Thr1_$\Delta$, Thr2_$\Delta$ ... Thrm_$\Delta$)] are averaged to be marked as φ;

η meets the following condition: η≥βφ, and 0<β<1;

The size of a pre-scheduling window can be PreSchWin=max($\Omega$, τ*$\xi$Average), where 0<τ<1.

Step 108 is ending.

Second Embodiment

A speed measuring website is different from an ordinary website. For the ordinary website, a data packet of a Ping service can be parsed out by a high layer to judge whether the data packet is sent in the Ping process. Whereas, for the speed measuring website, the high layer cannot judge the Ping by parsing a data packet, but needs to send a data packet of a fixed size periodically to test a time delay. In the embodiment, the period and the size of the data packet sent by the UE in the Ping process can be judged by the learning of an MAC layer so as to carry out pre-scheduling and further to shorten the time delay.

Firstly, the length of a unit window can be set as follows: w=500 ms, Δ=6, α=0.25. Then, the following steps are executed.

Step 101 is start.

Step 102 includes that during the initial random access of LTE, a timer is set and the learning for the law of traffic of the UE is started when the timer expires, and Step 103_1 is executed.

Specifically, when an UE example is set on the MAC layer, a timer is started, the timing length of the timer is set to T millisecond. When the timer expires, it is indicated that the initial random access process of the UE is completed.

The traffic statistic is started when the high layer sends a preamble from the UE; the value of the traffic statistic is reported to the MAC layer every millisecond; and since the number of bits to be transmitted in a certain window length is ensured to be definite no matter for the GBR or the NGBR service, if the UE is sending a data packet in the Ping process, the data packet is definite in size and period, and accordingly, the traffic is definite.

Step 103_1 includes that a unit window with a fixed length "w" is set, the magnitude of the traffic value reported from the high layer to the MAC layer in the unit window and a corresponding moment are recorded, and the maximal value of the traffic is calculated.

The specific learning process is as follows:

a time length of the learning is w*Δ and is taken as learning period, and whether to carry out pre-scheduling in a second learning period is determined according to a learning result in a first learning period; whether to carry out pre-scheduling in a third learning period is determined according to a learning result in the second learning period, and so on; the status array [StateValue1, StateValue2, StateValue3 . . . StateValue(Δ−1), StateValue Δ] learned in each learning period may be initialized to [0, 0, 0 . . . 0, 0] when the next learning period starts, and the learning process is continued all the time.

Provided that the initial value of the state value x is 0, x=1, 2, 3 . . . Δ−1, Δ, where Δ represents the times of continuous learning, and Step 103_2 to Step 103_8 are one learning process. A status array [StateValue1, StateValue2, StateValue3 . . . StateValue(Δ−1), StateValue] is calculated by learning continuously for Δ times, specifically as follows:

step 103_2: a unit window of a fixed length "w" millisecond is set, the magnitudes Thr1_x, Thr2_x, Thrm_x of traffic values reported from a user plane to the MAC layer in the unit window and the corresponding moments t1_, t2_x . . . tm_x are recorded, and γ=max (Thr1_x, Thr2_x . . . Thrm_x is calculated, where the unit of w is millisecond; the number more than αγ in (Thr1_x, Thr2_x . . . Thrm_x) is counted, and the number is set to n, where 0<alpha<1;

step 103_3: whether 1≤n≤θ is true is judged, if it is true, step 103_4 is executed, otherwise, step 103_5 is executed;

step 103_4: the status value x is assigned to 1 (it is determined that the UE is carrying out Ping), and step 104 is executed;

step 103_5: whether n>θ is true is judged, if it is true, step 103_6 is executed, otherwise, step 103_7 is executed.

step 103_6: the status value x is assigned to 2; the stored (Thr1_x, Thr2_x . . . Thrm_x) and t1_x, t2_x . . . tm_x are cleared; and step 104 is executed;

step 103_7: whether n=0 is true is judged, if it is true, step 103_8 is executed, otherwise, step 104 is executed;

step 103_8: the StateValuex is fixed, i.e., 0; the stored (Thr1_x, Thr2_x . . . Thrm_x) and t1_x, t2_x . . . tm_x are cleared; and step 104 is executed; and step 104: step 103_1 to Step 103_8 are repeated, each value in the status array [StateValue1, StateValue2, StateValue3 . . . StateValue(Δ−1), StateValue] is calculated through the steps above.

Step 105 is that whether the UE is carrying out Ping is judged according to the learned content, if (StateValueΔ=StateValue(Δ−2), and StateValueΔ=1), or (StateValue(Δ−1)=StateValueΔ−3), and StateValueΔ−1)=1), or (StateValueΔ)=StateValueΔ−3), and StateValueΔ)=1), it is indicated that the UE is carrying out Ping; otherwise, it is indicated that the UE is scheduled dynamically or is not in service, so that scheduling is carried out according to an actual condition.

Step 106 includes that a window of which the status value is 1 is selected for periodic judgment, specifically:

After learning is executed continuously for Δ times, the stored traffic values are:

[(Thr1_1, Thr2_1 . . . Thrm_1), (Thr1_2, Thr2_2 . . . Thrm_2) . . . (Thr1_Δ, Thr2_Δ . . . Thrm_Δ)];

the corresponding moments are:

[(t1_1, t2_1 . . . tm_1), (t1_2, t2_2 . . . tm_2) . . . (t1_Δ, t2_Δ . . . tm_Δ)];

Note: the values stored in the two arrays above are the corresponding values when StateValuex=1.

Every adjacent two values in the array [(t1_1, t2_1 . . . tm_1), (t1_2, t2_2 . . . tm_2) . . . (t1_Δ, t2_Δ . . . tm_Δ)] stored in the period of learning continuously for Δ times are subtracted to obtain difference values, i.e., [(t2_1−t1_1) . . . (tm_1−t(m−1)_1), (t1_2−tm_1) . . . ].

By the operation above, a status array is obtained, and the value ξ occurring most frequently in the status array is counted, and ξ is the period of sending a data packet by the UE in the Ping process. When ξ is not unique (such as ξ1, ξ2 and ξ3), the following processing can be executed: the mean of ξ is calculated, ξAverage=mean(ξ1, ξ2, ξ3); the ξAverage is taken as the period of sending a data packet by the UE in the Ping process; and Ω=max (|ξ$_{Average}$−ξ$_1$|, |ξ$_{Average}$−ξ$_2$|, ξ$_{Average}$−ξ$_3$) is taken to judge a fluctuation range of judging the window of a next Ping moment.

Step 107 includes that a pre-scheduling window is pre-scheduled.

As shown in FIG. 2, if it is determined that the UE is carrying out Ping through the learning of a first learning period, a second learning period is pre-scheduled. Firstly, the first point η of which the traffic is not 0 and which is considered to belong to Ping in the second learning period is found out, so as to predict the coming of a next Ping moment according to the period of sending a data packet by the UE in the Ping process.

η can be determined by many methods, for example:

after continuous learning is carried out for Δ times, the stored traffic values are [(Thr1_1, Thr2_1 . . . Thrm_1), (Thr1_2, Thr2_2 . . . Thrm_2) . . . (Thr1_Δ, Thr2_Δ . . . Thrm_Δ)]; and the values in the status array [(Thr1_(Δ−3), Thr2_(Δ−3) . . . Thrm_(Δ−3)), (Thr1_(Δ−2), Thr2_(−2) . . . Thrm_(Δ−2)), (Thr1_(Δ−1), Thr2_(Δ−1) . . . Thrm_(Δ−1)), (Thr1_Δ, Thr2_Δ . . . Thrm_Δ)] are averaged to be marked as φ;

η meets the following condition: η≥βφ, and 0<β<1.

The size of a pre-scheduling window can be PreSchWin=max(Ω,τ*ξAverage), where 0<τ<1.

Step 108 is ending.

The apparatus in an embodiment of the present disclosure includes a learning module, a judgment module, and a pre-scheduling module, wherein the learning module is configured to learn traffic of UE and inform the judgment module of a learning result;

the judgment module is configured to determine whether the UE is carrying out Ping according to the received learning result, determine a period of sending a data packet by the UE when determining that the UE is carrying out Ping, and further inform the pre-scheduling module of the period; and the pre-scheduling module is configured to carry out pre-scheduling according to the received period.

A time length of the learning is w*Δ and is taken as a learning period, where Δ is learning times in one learning period, and w is the duration of each learning.

The learning module is configured to set the statuses learned in the learning period as a status array; and the pre-scheduling module is configured to determine whether to carry out pre-scheduling in a later learning period according to a learning result in a previous learning period.

When determining whether the UE is carrying out Ping, the judgment module is configured to:

determine by comparison whether the adjacent values or the values with a fixed interval in the status array are equal, and if they are equal and indicate that the UE is carrying out Ping, determine that the UE is carrying out Ping.

When determining the period, the judgment module is configured to:

subtract the time points of the values stored in the learning period two by two, wherein a difference value occurring most frequently in the obtained difference values is a period of sending the data packet of the UE.

The learning module is further configured to receive a traffic statistic for the learning which is sent from a high layer to an MAC layer periodically.

To sum up, no matter for the method or the apparatus supporting the method, in the technology of implementing scheduling in a Ping process, a high layer can report a traffic statistic to an MAC layer; and the MAC layer learns continuously based on a set learning period so as to judge whether the UE is carrying out Ping and determines a period of sending a data packet by UE when determining that the UE is carrying out Ping, so as to predict the coming of a next data packet for the Ping and carry out pre-scheduling; therefore, the time of sending an SR is saved for the UE, and the time delay for UE to perform Ping is reduced. Moreover, the technology can be used in the network all the time and do not affect the traffic of the system.

The above are only the preferred embodiments of the present disclosure, and are not intended to limit the scope of protection of the claims of the present disclosure.

What is claimed is:

1. A method for implementing scheduling in a Packet Internet Grope (Ping) process, comprising:
   learning about, by a Media Access Control (MAC) layer of an Evolved Node B (eNB), traffic of User Equipment (UE), determining whether the UE is carrying out Ping according to a learning result, determining a period of sending a data packet by the UE when the MAC layer determines that the UE is carrying out Ping, and carrying out pre-scheduling according to the period;
   setting statuses learned in the learning period as a status array; and
   determining whether to carry out pre-scheduling in a later learning period according to a learning result in a previous learning period;
   wherein a time length of the learning is w * Δ and is taken as a learning period, where Δ is learning times in the learning period, and w is a duration of each learning.

2. The method according to claim 1, wherein determining whether the UE is carrying out Ping comprises:
   determining by comparison whether adjacent values or values with a fixed interval in the status array are equal, and if the adjacent values or the values with a fixed interval are equal and indicate that the UE is carrying out Ping, then determining that the UE is carrying out Ping.

3. The method according to claim 2, wherein determining the period comprises:
   subtracting time points of values stored in a learning period two by two to obtain difference values, and taking a difference value obtained most frequently in the difference values as the period of sending a data packet by the UE.

4. The method according to claim 1, wherein determining the period comprises:
   subtracting time points of values stored in a learning period two by two to obtain difference values, and taking a difference value obtained most frequently in the difference values as the period of sending a data packet by the UE.

5. The method according to claim 1, further comprising:
   periodically sending, by a high layer, a traffic statistic for carrying out the learning to the MAC layer.

6. An apparatus for implementing scheduling in a Packet Internet Grope (Ping) process, comprising:
   a memory storing programming instructions; and
   a processor configured to execute the stored programming instructions to perform steps comprising:
   learning about traffic of User Equipment (UE);
   determining whether the UE is carrying out Ping according to the learning result, and determining a period of sending a data packet by the UE when determining that the UE is carrying out Ping;
   carrying out pre-scheduling according to the period;
   setting statuses learned in the learning period as a status array; and
   determining whether to carry out pre-scheduling in a later learning period according to a learning result of a previous learning period;
   wherein a time length of the learning is w * Δ and is taken as a learning period, where Δ is learning times in the learning period, and w is a duration of each learning.

7. The apparatus according to claim 6, wherein determining whether the UE is carrying out Ping comprises:
   determining by comparison whether adjacent values or values with a fixed interval in the status array are equal, and if the adjacent values or the values with a fixed interval are equal and indicate that the UE is carrying out Ping, determining that the UE is carrying out Ping.

8. The apparatus according to claim 7, wherein determining the period comprises,
   subtracting time points of values stored in a learning period two by two to obtain difference values, and taking a difference value obtained most frequently in the difference values as the period of sending a data packet by the UE.

9. The apparatus according to claim 6, wherein determining the period comprises:

subtracting time points of values stored in a learning period two by two to obtain difference values, and taking a difference value obtained most frequently in the difference values as the period of sending a data packet by the UE.

10. The apparatus according to claim 6, wherein the processor is configured to execute the stored programming instructions to perform steps comprising:

receiving a traffic statistic for carrying out the learning which is sent from a high layer to a Media Access Control (MAC) layer periodically.

* * * * *